United States Patent
Boscaino et al.

(10) Patent No.: US 11,220,077 B2
(45) Date of Patent: Jan. 11, 2022

(54) PROCESS FOR APPLYING NOISE-REDUCING ELEMENTS TO A TYRE FOR VEHICLE WHEELS

(71) Applicant: PIRELLI TYRE S.P.A., Milan (IT)

(72) Inventors: Ivan Gildo Boscaino, Milan (IT); Gianni Mancini, Milan (IT); Cristiano Puppi, Milan (IT); Erika Vaniglia, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 215 days.

(21) Appl. No.: 16/469,088

(22) PCT Filed: Dec. 20, 2017

(86) PCT No.: PCT/IB2017/058218
§ 371 (c)(1),
(2) Date: Jun. 12, 2019

(87) PCT Pub. No.: WO2018/116209
PCT Pub. Date: Jun. 28, 2018

(65) Prior Publication Data
US 2020/0094503 A1     Mar. 26, 2020

(30) Foreign Application Priority Data

Dec. 23, 2016  (IT) .................. 102016000130514

(51) Int. Cl.
*B32B 41/00*     (2006.01)
*B29D 30/06*     (2006.01)
(Continued)

(52) U.S. Cl.
CPC ........ *B29D 30/0681* (2013.01); *B60C 19/002* (2013.01); *G01B 11/002* (2013.01); *G01M 17/027* (2013.01)

(58) Field of Classification Search
CPC ........ B29D 30/0681; B29D 2030/0027; B29D 30/0061; B60C 19/002; G01B 11/002; G01M 17/027
(Continued)

(56) References Cited

U.S. PATENT DOCUMENTS

2005/0098251 A1     5/2005   Yukawa
2005/0205183 A1*    9/2005   Yukawa ................ B60C 19/002
                                                                  152/450
(Continued)

FOREIGN PATENT DOCUMENTS

CN         1613672 A    5/2005
CN         1894113 A    1/2007
(Continued)

OTHER PUBLICATIONS

Russian Office Action and Search Report for RU Application No. 2019122403/05 filed on Dec. 20, 2017 on behalf of Pirelli Tyre S.P.A. dated Jan. 18, 2021, 16 pages (English + Original).
(Continued)

*Primary Examiner* — Michael N Orlando
*Assistant Examiner* — Joshel Rivera
(74) *Attorney, Agent, or Firm* — Steinfl + Bruno LLP (57) ABSTRACT

Process and an apparatus for applying noise-reducing elements to a tyre for vehicle wheels that has a radially inner surface with a service area and having a circumferential dimension. The process determines the position in circumferential direction of the service area on the radially inner surface of the tyre, determines the position in circumferential direction of a target area on the radially inner surface of the tyre based on the position in circumferential direction of the service area, and applies a noise-reducing element at the target area. The position in circumferential direction of the service area is determined by circumferentially inspecting
(Continued)

the radially inner surface of the tyre starting from a reference position, detecting the angular position of the service area with respect to the reference position and determining the position in circumferential direction of the service area based on the angular position and on the circumferential dimension of the radially inner surface of the tyre.

13 Claims, 4 Drawing Sheets (51) Int. Cl.
  *B60C 19/00* (2006.01)
  *G01B 11/00* (2006.01)
  *G01M 17/02* (2006.01)

(58) Field of Classification Search
  USPC .................. 156/60, 64, 350, 351, 378, 379
  See application file for complete search history.

(56) References Cited

U.S. PATENT DOCUMENTS

| 2007/0074798 A1 | 4/2007 | Tanno et al. |
| 2013/0087259 A1 | 4/2013 | Mancini |

FOREIGN PATENT DOCUMENTS

| CN | 1954996 A | 5/2007 |
| CN | 102958686 A | 3/2013 |
| DE | 10017621 A1 | 10/2001 |
| DE | 102007028933 A1 | 1/2009 |
| EP | 0958881 A1 | 11/1999 |
| EP | 1659004 A1 | 5/2006 |
| JP | H08132816 A | 5/1996 |
| JP | H10305715 A | 11/1998 |
| RU | 2076805 C1 | 4/1997 |
| SU | 874387 A1 | 10/1981 |
| SU | 1519918 A1 | 11/1989 |
| WO | 99/41093 A1 | 8/1999 |
| WO | 2016/067192 A1 | 5/2016 |
| WO | 2016/088014 A1 | 6/2016 |

OTHER PUBLICATIONS

International Search Report & Written Opinion for International Application No. PCT/IB2017/058218 filed Dec. 20, 2017 on behalf of Pirelli Tyre S.P.A. dated Mar. 20, 2018. 13 pages.
Chinese First Office Action for CN Application No. 201780079352.2 filed on Dec. 20, 2017 on behalf of Pirelli Tyre S.P.A. dated Mar. 1, 2021 20 pages (English +Original).
Second Chinese Office Action for CN Application No. 201780079352 filed on Dec. 20, 2017 on behalf of Pirelli Tyre S.P.A. dated Aug. 11, 2021 10 pages (English + Original).
Chinese Notice of Allowance for CN Application No. 201780079352.2 filed on Dec. 20, 2017 on behalf of Pirelli Tyre S.P.A. dated Nov. 12, 2021 (English + Original). 6 pages.

* cited by examiner

PROCESS FOR APPLYING NOISE-REDUCING ELEMENTS TO A TYRE FOR VEHICLE WHEELS

CROSS-REFERENCE TO RELATED APPLICATIONS

The present application is the U.S. National Stage of International Patent Application No. PCT/IB2017/058218 filed on Dec. 20, 2017 which, in turn, claims priority to Italian Patent Application No. 102016000130514 filed on Dec. 23, 2016.

The present invention relates to a process and an apparatus for applying noise-reducing elements to a tyre for vehicle wheels.

Preferably, the process and the apparatus of the present invention allow an automatic or substantially automatic application of the aforementioned noise-reducing elements on the tyre.

The term "automatic" is used to indicate an operation carried out by mechanical devices, without the need for manual intervention of an operator.

The term "mechanical devices" is used to indicate devices that are entirely mechanical, electro-mechanical, hydraulic or pneumatic, possibly controlled by a control unit through suitable software.

The expression "substantially automatic" is used to indicate that most of the operations are carried out by the aforementioned mechanical devices and the manual intervention of an operator is limited to a few specific operations. In the specific case of the present invention, the manual intervention of the operator is at most limited to the initial arrangement of the noise-reducing elements, for example to the positioning of the noise-reducing elements on a support device, like for example a conveyor belt, a roller conveyor, etc.

The expression "noise-reducing element" is used to indicate an element that, once associated with a tyre for vehicle wheels, has the capability to reduce the noise produced by the tyre during use. Such a capability is preferably given to the aforementioned element by the type of material from which the aforementioned element is made. A material suitable for this purpose is for example a sound-absorbing porous material, like for example a foamed polymeric material, for example open-cell foamed polyurethane.

The expression "elastomeric material" is used to refer to a composition comprising at least one elastomeric polymer and at least one reinforcing filler. Preferably, such a composition further comprises additives like, for example, a cross-linking agent and/or a plasticizer. Thanks to the presence of the cross-linking agent, such a material can be cross-linked through heating, so as to form the final manufactured product.

The terms "radial" and "axial" and the expressions "radially inner/outer" and "axially inner/outer" are used with reference to the radial direction of the tyre (i.e. to a direction perpendicular to the rotation axis of the tyre) and to the axial direction of the tyre (i.e. to a direction parallel to the rotation axis of the tyre). The terms "circumferential" and "circumferentially", on the other hand, are used with reference to the annular extension of the tyre.

The expression "feeding direction" is used to indicate a direction of movement parallel to the longitudinal direction of a support device, like for example a conveyor belt, a roller conveyor, etc. The feeding direction thus corresponds to the advancing direction of the item which is arranged above the support device.

The expressions "bottom", "under", "lower" or "below", and "top", "above", "upper" or "over" are used to indicate a relative position with respect to the aforementioned support device.

The expressions "downstream" or "head", and "upstream" or "tail", are used with reference to the aforementioned feeding direction. Therefore, assuming for example a feeding direction from left to right, a "downstream" or "head" position with respect to any reference element indicates a position to the right of said reference element and an "upstream" or "tail" position indicates a position to the left of said reference element.

The expression "target area" is used to indicate an area of the radially inner surface of the tyre on which a noise-reducing element has to be deposited.

The expression "service area" is used to indicate an area of the radially inner surface of the tyre on which a noise-reducing element does not have be deposited, for example because it is foreseen that at such a service area the tyre will be equipped with an electronic device configured to detect operating parameters of the tyre, like for example pressure, acceleration, temperature, etc.

The term "image" is used to indicate in general a set of data, typically contained in a computer file, in which each n-tuple of coordinates (typically each pair of coordinates) of a finite set (typically two-dimensional and matrix-type, i.e. N rows×M columns) of n-tuples of spatial coordinates (each n-tuple corresponding to a "pixel") is associated with a corresponding set of numerical values (which can be representative of magnitudes of a different type). For example, in monochromatic images (like the ones in grayscale) such a set of values consists of a single value in a finite scale (typically with 256 levels or tones), such a value being for example representative of the level of luminosity (or intensity) of the respective n-tuple of spatial coordinates when visualized. A further example is represented by color images, in which the set of values represents the level of luminosity of multiple colors, or channels, typically the primary colors (for example red, green and blue in RGB coding, whereas cyan, magenta, yellow and black in CMYK coding). The term "image" does not necessarily imply the actual visualization thereof.

Any reference to a specific "image" more generally includes any image which can be obtained through one or more digital processing operations of said specific image (like for example filtering, equalization, 'smoothing', binarization, thresholding, morphological transformations ('opening', etc.), derivative or integral calculations, etc.).

A tyre for vehicle wheels generally comprises a carcass structure comprising at least one carcass ply formed of reinforcing cords incorporated in a matrix of elastomeric material. The carcass ply has end edges respectively engaged with annular anchoring structures. The latter are arranged in the areas of the tyre usually identified by the name "beads" and each of them is normally formed from a substantially circumferential annular insert on which at least one filling insert is applied, in radially outer position. Such annular inserts are commonly identified as "bead cores" and have the task of keeping the tyre firmly fixed to the anchoring seat specifically provided in the rim of the wheel, thus preventing in operation the radially inner end edge of the tyre to come out from such a seat.

Specific reinforcing structures having the function of improving the torque transmission to the tyre can be provided at the beads.

A crown structure is associated in a radially outer position with respect to the carcass structure.

The crown structure comprises a belt structure and, in a radially outer position with respect to the belt structure, a tread band made of elastomeric material.

The belt structure comprises one or more belt layers arranged radially one on top of the other and having textile or metallic reinforcing cords with a crossed orientation and/or an orientation substantially parallel to the direction of circumferential extension of the tyre.

A layer of elastomeric material, called "under-belt", can be provided between the carcass structure and the belt structure, said layer having the function of making the radially outer surface of the carcass structure as uniform as possible for the subsequent application of the belt structure.

A so-called "under-layer" can be arranged between the tread band and the belt structure, the under-layer being made of an elastomeric material having properties suitable for ensuring a steady union of the tread band to the belt structure.

Respective sidewalls of elastomeric material are applied on the side surfaces of the carcass structure, each extending from one of the side edges of the tread band up to the respective annular anchoring structure to the beads.

EP 1 659 004 describes an example of a tyre comprising, on the radially inner surface thereof, noise-reducing elements.

WO 99/41093 discloses a tyre comprising, on the radially inner surface thereof, an electronic device intended to monitor the performance of the tyre.

WO 2016/067192, to the same Applicant, discloses a process and an apparatus for applying a noise-reducing element to a tyre for vehicle wheels. The noise-reducing element is arranged on a first conveyor belt moved along a feeding direction and having, on an upper surface thereof, a continuous film which supports a layer of adhesive material. The noise-reducing element is subsequently pressed against the continuous film so as to make it adhere firmly to a portion of the layer of adhesive material. As a consequence of the movement of the first conveyor belt along the feeding direction, the noise-reducing element is subsequently transferred to a second conveyor belt arranged downstream of the first conveyor belt along the aforementioned feeding direction. During such transferal the continuous film is held at the first conveyor belt and, as soon as the noise-reducing element has left the first conveyor belt, the portion of layer of adhesive material that adheres to the noise-reducing element is detached from the layer of adhesive material which is on the first conveyor belt. The noise-reducing element is finally picked up from the second conveyor belt and positioned in a predetermined position on a radially inner surface of a tyre arranged on an adjacent conveyor belt.

The Applicant observes that what is described in WO 2016/067192 makes it possible to achieve a high automation of the gluing process of the noise-reducing elements to the tyres, in such a way obtaining an increase in productivity of the lines dedicated to the manufacturing of tyres provided with noise-reducing elements.

The Applicant has considered the problem of carrying out the automatic gluing of noise-reducing elements, according to the ways for example described in WO 2016/067192, on tyres that have, on the respective radially inner surfaces, one or more service areas, for example areas on which it is foreseen to apply an electronic device, of the type for example of that described in WO 99/41093.

The Applicant has observed that in this case it is necessary to avoid the risk that, during the automatic gluing process of the noise-reducing elements, a noise-reducing element is accidentally deposited on a service area. In this case it would indeed be impossible to have a possible subsequent application of an electronic device on such a service area.

The Applicant has perceived that such a risk can be avoided by determining the circumferential position, on the radially inner surface of the tyre, of the area on which the noise-reducing element (target area) has to be deposited based on the position in circumferential direction of the service areas.

The Applicant has found that by carrying out an inspection of the radially inner surface of the tyre aimed at identifying the angular position of a service area with respect to a reference position and determining the circumferential distance of such a service area from such a reference position based on its angular position and of the circumferential dimension of the radially inner surface of the tyre, it is possible to determine, on the radially inner surface of the tyre, one or more areas distinct from the service areas and on which it is possible to deposit a noise-reducing element.

The present invention therefore relates, in a first aspect thereof, to a process for applying noise-reducing elements to a tyre for vehicle wheels.

Preferably, said tyre has a radially inner surface comprising at least one service area.

Preferably, said radially inner surface has a predetermined circumferential dimension.

Preferably, the position in circumferential direction of said at least one service area on said radially inner surface of the tyre is determined.

Preferably, the position in circumferential direction of at least one target area on said radially inner surface of the tyre is determined based on the position in circumferential direction of said at least one service area.

Preferably, at least one noise-reducing element is applied at said at least one target area.

Preferably, the position in circumferential direction of said at least one service area is determined by inspecting said radially inner surface of the tyre.

Preferably, said radially inner surface of the tyre is circumferentially inspected starting from a predetermined reference position.

Preferably, the position in circumferential direction of said at least one service area is determined by detecting the angular position of said at least one service area with respect to said reference position.

Preferably, the position in circumferential direction of said at least one service area is determined based on said angular position and on the circumferential dimension of said radially inner surface of the tyre.

The Applicant believes that due to the fact that the position of the area in which the noise-reducing element (target area) has to be glued is determined on the basis of the position of the service area(s), the aforementioned process allows the gluing of noise-reducing elements in areas distinct from, and not overlapping to, the service areas.

In a second aspect thereof, the present invention relates to an apparatus for applying noise-reducing elements to a tyre for vehicle wheels.

Preferably, said tyre has a radially inner surface comprising at least one service area.

Preferably, said radially inner surface has a predetermined circumferential dimension.

Preferably, a support device of said tyre is provided.

Preferably, a detection device is provided.

Preferably, said detection device is configured to detect at least one service area on said radially inner surface of the tyre.

Preferably, a gripping member which is configured to pick up at least one noise-reducing element and position it onto at least one target area defined on the tyre is provided.

Preferably, said at least one target area is defined on said radially inner surface of the tyre.

Preferably, a control unit which is operatively associated with said detection device is provided.

Preferably, said control unit is configured to determine the position in circumferential direction of said at least one service area on said radially inner surface of the tyre.

Preferably, said control unit is configured to determine the position in circumferential direction of said at least one target area on said radially inner surface of the tyre based on the position in circumferential direction of said at least one service area and of said predetermined circumferential dimension of said radially inner surface of the tyre.

The apparatus described above allows the actuation of the method described above.

The present invention, in at least one of the aforementioned aspects, can have at least one of the preferred features described hereinafter.

Preferably, inspecting said radially inner surface of the tyre comprises analyzing at least one circumferential portion of said radially inner surface of the tyre by means of a sensor.

Preferably, inspecting said radially inner surface of the tyre comprises moving said sensor around a reference axis parallel to or coinciding with a rotation axis of the tyre starting from said reference position.

Preferably, said sensor covers an angle equal to at least 360° around said reference axis starting from said reference position. In this way, it is possible to identify the possible presence of many service areas on the radially inner surface of the tyre.

Preferably, detecting the angular position of said at least one service area comprises acquiring a first image of said at least one service area when said sensor detects a contrast element provided on said radially inner surface of the tyre at said at least one service area.

Preferably, detecting the angular position of said at least one service area comprises determining the circumferential distance travelled by said sensor with respect to said reference position when said first image has been acquired.

Preferably, the position in circumferential direction of said at least one service area is determined based on said circumferential distance.

Preferably, said contrast element is defined on a film removably associated with said radially inner surface of the tyre at said at least one service area. In this way, it is possible to remove the film once the service area has been identified, for example so as to allow a possible subsequent application of an electronic device on such a service area. The film also makes it possible to keep clean the portion of the radially inner surface of the tyre on which the aforementioned electronic device will be applied.

Preferably, said contrast element is substantially triangle or arrow-shaped.

Preferably, a vertex of the triangle or arrow is oriented along a direction of removal of said film.

Preferably, said film comprises a main portion and a detection portion adjacent to said main portion and having a first length in circumferential direction and a second length in axial direction.

Preferably, said contrast element is defined on said detection portion.

Preferably, before determining the position in circumferential direction of said at least one service area said tyre is moved along a feeding direction.

In first embodiments, said film is associated with said radially inner surface of the tyre so that said detection portion is arranged upstream of said main portion with reference to said feeding direction.

In this case, preferably, said contrast element is arranged on said detection portion in an axially centered position.

In second embodiments, said film is associated with said radially inner surface of the tyre so that said detection portion is arranged downstream of said main portion with reference to said feeding direction.

Also in this case, preferably, said contrast element is arranged on said detection portion in an axially centered position.

In further embodiments, said film is associated with said radially inner surface of the tyre so that said detection portion is parallel to said main portion with reference to said feeding direction.

In this case, preferably, said contrast element is arranged on said detection portion in a circumferentially centered position.

Preferably, the position of said detection portion with respect to said main portion with reference to said feeding direction is determined by comparing said first image with a second image acquired by said sensor after said first image. In this way, it is determined whether the detection portion is arranged upstream, downstream or parallel to the main portion with reference to said feeding direction.

Preferably, determining the position in circumferential direction of said at least one target area comprises calculating a first linear dimension as a function of said circumferential distance.

Preferably, calculating said first linear dimension comprises adding to said circumferential distance, or subtracting from said circumferential distance, a second linear dimension. In this way, it is ensured that the circumferential position of the target area is adjacent to and does not overlap that of the service areas.

Preferably, the radially inner surface of the tyre comprises at least two service areas.

Preferably, the position in circumferential direction of said at least two service areas is determined.

Preferably, the circumferential distance between said at least two service areas is calculated.

Preferably, the position in circumferential direction of said at least one target area on said radially inner surface of the tyre is determined based on the position in circumferential direction of said at least two service areas and of the circumferential distance between said at least two service areas.

Preferably, at least one noise-reducing element is applied at said at least one target area.

Preferably, said noise-reducing elements have a predetermined length in circumferential direction.

Preferably, the number of noise-reducing elements that can be applied between said at least two service areas is determined as a function of said predetermined length in circumferential direction.

Preferably, said sensor is a first camera.

Preferably, said support device is movable along a predetermined feeding direction.

Preferably, a feeding device configured to feed said at least one noise-reducing element is provided.

Preferably, said feeding device is movable along a direction parallel to said predetermined feeding direction.

Preferably, said detection device is arranged above said support device.

Preferably, said detection device comprises a first camera movable along a direction parallel to or coinciding with a rotation axis of the tyre.

Preferably, said first camera is rotatable around a reference axis parallel to or coinciding with said rotation axis of the tyre.

Preferably, said first camera is configured to acquire a first image of said at least one service area when said first camera frames said at least one service area.

Preferably, an encoder is operatively associated with said first camera. Such an encoder makes it possible to obtain numerical information on the circumferential distance travelled by said first camera during its the movement around the aforementioned reference axis.

Preferably, said control unit is configured to determine the circumferential distance travelled by said first camera with respect to a reference position when said first camera has acquired said first image.

Preferably, said control unit is configured to calculate a first linear dimension based on said circumferential distance and on the circumferential dimension of said radially inner surface of the tyre.

Preferably, said control unit is configured to compare said first image with a second image acquired by said first camera after said first image.

Preferably, stop members configured to stop said tyre on said support device are provided at said first camera.

Preferably, a second camera which rotates integral with said first camera is provided. Such a second camera can for example be used to identify possible spots of substances previously applied on the radially inner surface of the tyre for different purposes. In this case, the first and second camera can advantageously share the electronic and mechanical components necessary for their movement, with consequent advantages in functional and structural terms. Even more advantageously, the cycle time of the first camera can overlap that of the second camera, or vice-versa, with consequent advantages in terms of process (increase in the total cycle time equal to zero).

Preferably, said second camera is oriented at 180° with respect to said first camera. Such a provision makes it possible to avoid possible overlapping between the field of view of one camera and that of the other camera.

Further features and advantages of the present invention will become clearer from the following detailed description of preferred embodiments thereof, made with reference to the attached drawings.

In FIGS. 1-4, reference numeral 1 wholly indicates an example embodiment of an apparatus for automatically applying one after the other a plurality of noise-reducing elements 100 on a radially inner surface 501 of a tyre 500 for vehicle wheels, in accordance with the present invention.

Figure 5:
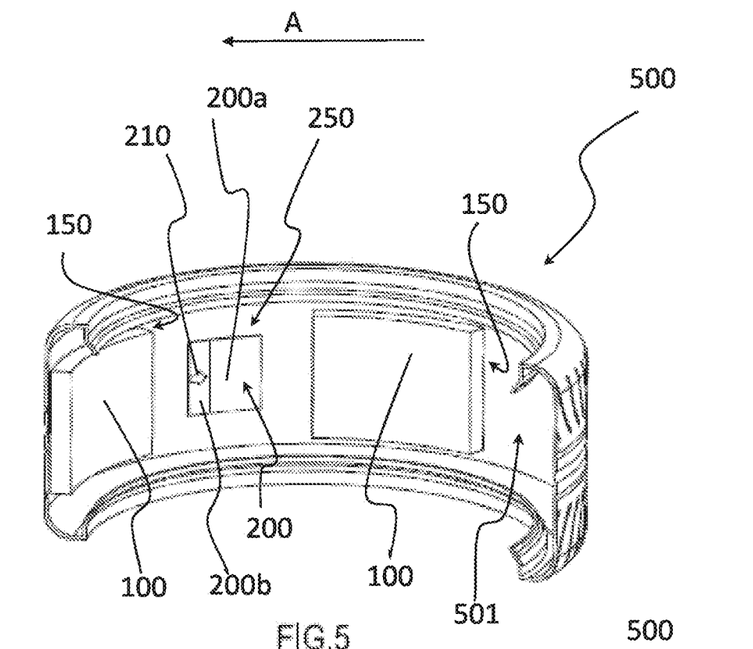
FIGS. 5 and 6 are schematic perspective views of a section of a tyre for vehicle wheels on the inner surface of which a plurality of noise-reducing elements have been glued through the apparatus of FIG. 1.
Figure 6:
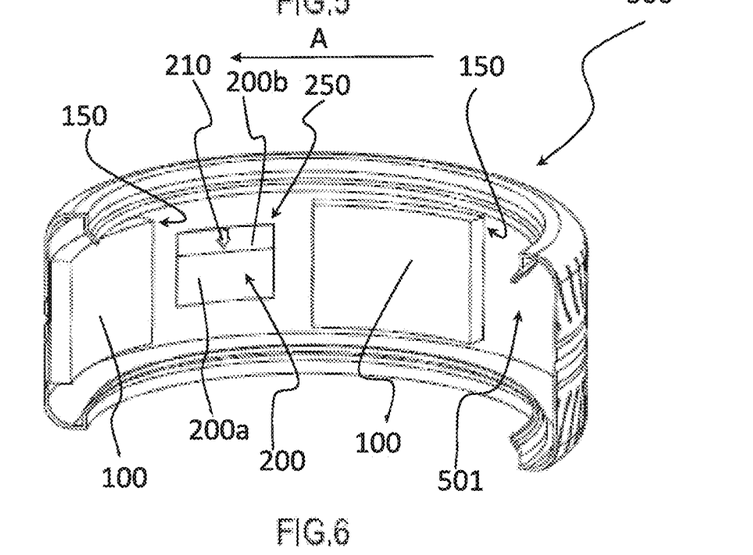

An example of such a tyre 500 is illustrated in FIGS. 5 and 6. Preferably such a tyre 500 is intended to be used in four-wheel vehicles, more preferably high-performance cars.

The noise-reducing elements 100 are preferably rectangular parallelepiped shaped. More preferably, they have a width comprised between about 100 mm and about 250 mm (in FIGS. 5 and 6 such a width is measured in the axial direction), a length comprised between about 100 mm and about 300 mm (in FIGS. 5 and 6 such a length is measured in the circumferential direction) and a thickness comprised between about 15 mm and about 50 mm. However, noise-reducing elements 100 having shape and dimensions different from those indicated here can be used as well.

The noise-reducing elements 100 have, on a face thereof, an adhesive material that allows them to be glued on the radially inner surface 501 of the tyre 500.

As illustrated in FIGS. 5 and 6, the noise-reducing elements 100 are glued on the radially inner surface 501 of the tyre 500 along the circumferential direction thereof, by arranging the longer sides of the noise-reducing elements 100 substantially parallel to the aforementioned circumferential direction.

The noise-reducing elements 100 are preferably made of sound-absorbing porous material, for example a foamed polymeric material, preferably open-cell foamed polyurethane. However, a different material that has analogous noise-reducing capabilities can be used.

The density of the noise-reducing elements 100 is preferably comprised between about 20 Kg/m$^3$ and about 200 Kg/m$^3$. In a specific example embodiment, such a density is equal to about 40 Kg/m$^3$.

Figure 1:
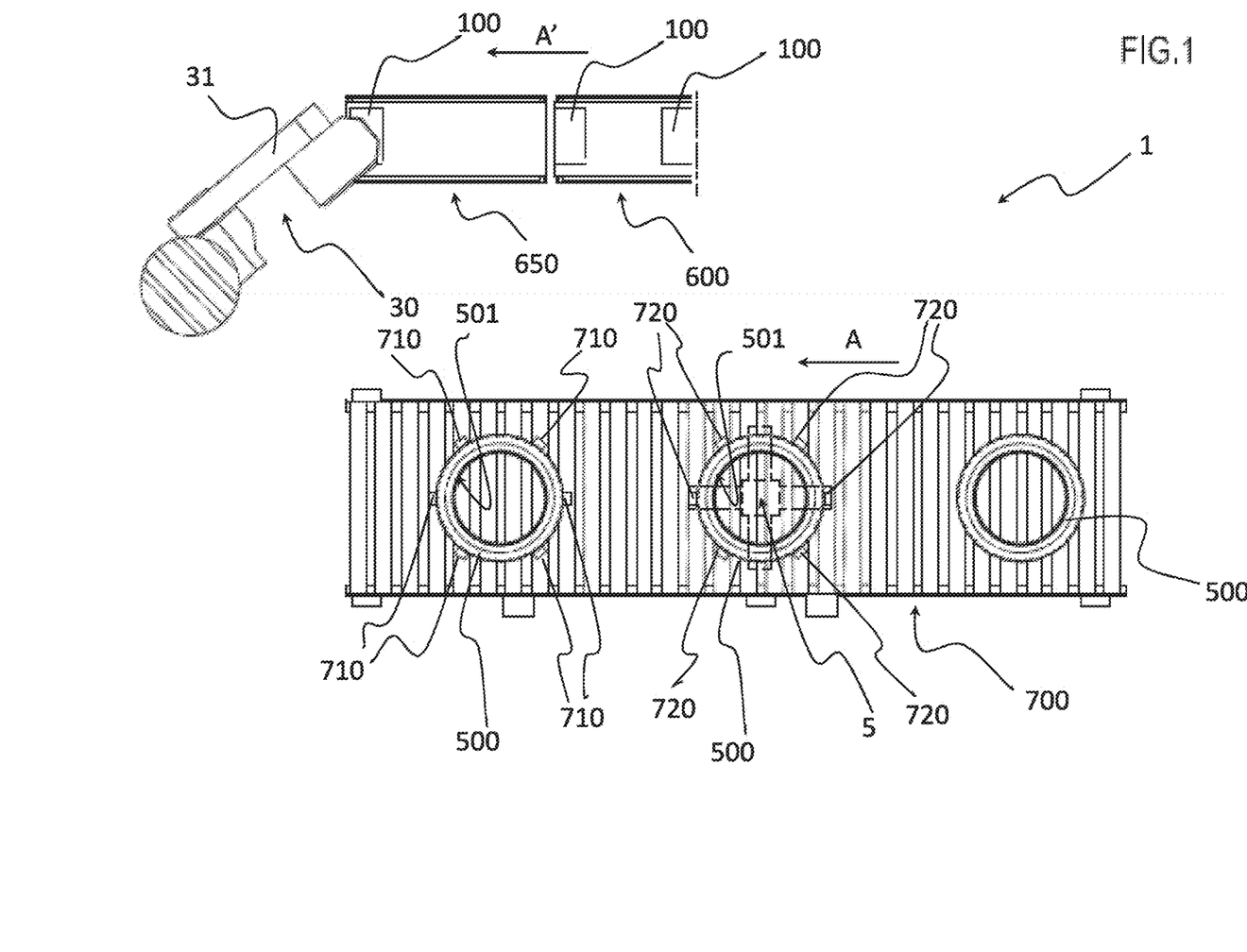
FIG. 1 is a schematic view from above of an example embodiment of an apparatus for automatically applying noise-reducing elements to a tyre for vehicle wheels in accordance with the present invention, such an apparatus being illustrated in a first operative configuration thereof.
Figure 3:
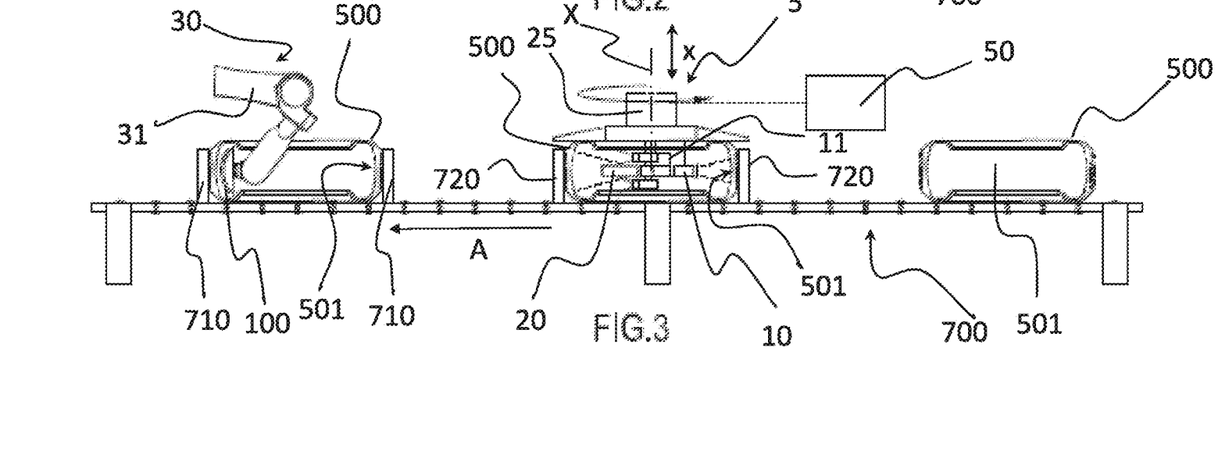
FIG. 3 is a schematic side view of the portion of apparatus of FIG. 1 in an operative configuration different from that of FIGS. 1 and 2.

With reference to FIGS. 1 and 3, the apparatus 1 comprises a feeding device 650 configured to feed the noise-reducing elements 100. In the specific example illustrated herein, the feeding device 650 is a conveyor belt.

With reference to FIGS. 1-4, the apparatus 1 further comprises a support device 700 configured to support one or more tyres 500 on which the noise-reducing elements 100 have to be glued.

The support device 700 is adjacent to the feeding device 650 and, preferably, extends parallel thereto.

FIGS. 1-4 illustrate three tyres 500 arranged in succession on the support device 700 along a feeding direction A. In the specific example illustrated herein, the transportation device 700 is a roller conveyor belt.

Figure 4:
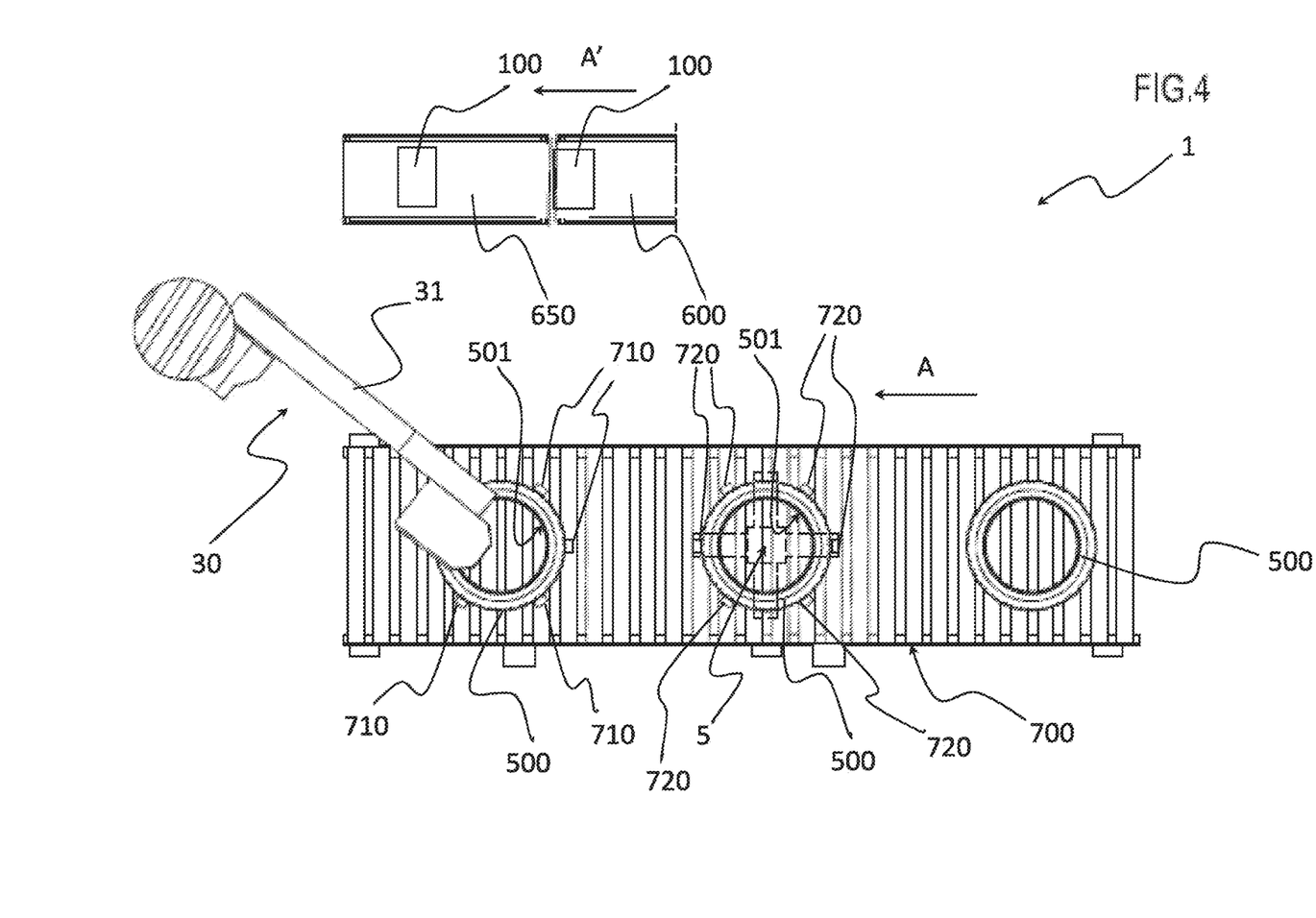
FIG. 4 is a schematic view from above of the portion of apparatus of FIG. 1 in a further operative configuration.

With particular reference to FIGS. 1, 3 and 4, the apparatus 1 further comprises a gripping member 30 configured to pick up the noise-reducing elements 100 one after the other from the feeding device 650 and transfer them towards the support device 700 to finally glue them on the radially inner surface 501 of a first tyre (the one that in FIGS. 1-4 is arranged to the left on the support device 700).

The gripping member 30 preferably comprises a robotized arm 31, preferably of the anthropomorphous type with at least six axes. The robotized arm 31 is preferably of the overhead type (i.e. it is intended to be associated with the ceiling or with an aerial beam) so as not to occupy space on the ground. However, it is alternatively possible to use a robotized arm constrained to the ground.

Preferably, picking up the noise-reducing elements 100 from the feeding device 650 and gluing them on the radially inner surface 501 of the aforementioned first tyre takes place as described in WO 2016/067192.

Once the gluing operations of all of the noise-reducing elements 100 on the aforementioned first tyre are complete, such a first tyre is picked up and its place is taken by a second tyre (the one that in FIGS. 1-4 is arranged on the support device 700 immediately upstream of the aforementioned first tyre with reference to the feeding direction A), so as to be able to proceed to proceed with the gluing of a plurality of noise-reducing elements 100 on this last tyre 500. The movement of the aforementioned second tyre to the position occupied by the first tyre takes place due to the movement of the support device 700 along the feeding direction A. Such movement takes a third tyre (the one that in FIGS. 1-4 is arranged to the right on the support device 700, i.e. immediately upstream of the aforementioned second tyre with reference to the feeding direction A) in the position that in FIGS. 1-4 is occupied by the aforementioned second tyre.

During the gluing operations, the tyre 500 on which the noise-reducing elements 100 are glued (the one arranged to the left on the support device 700 in FIGS. 1-4) is held in position on the support device 700 by suitable holding members 710. In the specific example illustrated herein, such holding members 710 can be moved vertically with respect to the support device 700 and are uniformly distributed around the tyre 500, so as to also obtain the centering of the tyre 500 with respect to the aforementioned holding members 710. In particular, in the specific example illustrated herein six holding members 710 which are equally spaced apart angularly from each other by 60° are provided.

The feeding device 650 moves the noise-reducing elements 100 in sequence along a direction A' that, preferably, is parallel to the feeding direction A of the tyre 500, until they are brought to a position in which they are picked up by the gripping member 30.

Upstream of the feeding device 650, with reference to the direction A', a transferring conveyor 600 that takes care to feed the noise-reducing elements 100 onto the feeding device 650 is provided.

The feeding device 650 and the transferring conveyor 600 are therefore aligned, and arranged in succession, along the direction A'.

The passage of the noise-reducing elements 100 from the transferring conveyor 600 to the feeding device 650 preferably takes place as a consequence of the synchronous movement of the transferring conveyor 600 and of the feeding device 650 along the direction A'. As soon as each noise-reducing element 100 is arranged, preferably entirely, above the feeding device 650, the latter is moved along the direction A' while keeping the transferring conveyor 600 stationary, so as to move the noise-reducing element 100 arranged on the feeding device 650 away from the one which is immediately subsequent and still arranged on the conveyor belt 600.

Preferably, the noise-reducing elements 100 are fed to the transferring conveyor 600 and, from the latter to the feeding device 650, as described in WO 2016/067192.

The tyre 500 exemplified in FIGS. 5 and 6 comprises, on the radially inner surface 501 thereof, a service area 250 intended for example to receive an electronic device configured to detect operating parameters of the tyre 500, like for example pressure, acceleration, temperature, etc.

In the specific example illustrated in FIGS. 5 and 6, an adhesive film 200 is applied onto such a service area 250. The adhesive film 200 can be removed before a possible application of the aforementioned electronic device.

The film 200 is substantially quadrangular, preferably rectangular or square in shape. It comprises a main portion 200*a* and a detection portion 200*b* adjacent to the main portion 200*a* and having a contrast element 210.

Preferably, the film 200 is made of a plastic material.

Preferably, the main portion 200*a* is transparent or has an opaque color, more preferably black.

Preferably, the detection portion 200*b* has a light color, more preferably white.

Preferably, the contrast element 210 has a dark color, more preferably black.

Preferably, the contrast element 210 is shaped like a triangle or, as illustrated in FIGS. 5 and 6, like an arrow, more preferably with a vertex thereof oriented so as to indicate the direction of removal of the film 200 from the radially inner surface 501 of the tyre 500.

The detection portion 200*b* has a first length in circumferential direction and a second length in axial direction.

FIG. 5 shows a first example of application of the film 200 on the radially inner surface 501 of the tyre 500. In this case, the film 200 is square in shape and is applied so that the detection portion 200*b* is arranged downstream of the main portion 200*a* with reference to the feeding direction A of the tyre 500. The first length of the detection portion 200*b* is in this case shorter than the total circumferential dimension of the film 200. The film 200 is preferably removed by pulling it in the circumferential direction.

FIG. 6 shows a second example of application of the film 200 on the radially inner surface 501 of the tyre 500. In this case, the film 200 is rectangular in shape and is applied so that the detection portion 200*b* is parallel to the main portion 200*a* with reference to the feeding direction A of the tyre 500. The first length of the detection portion 200*b* is in this case equal to the total circumferential dimension of the film 200. The film 200 is preferably removed by pulling it in the axial direction.

Preferably, the contrast element 210 is arranged on the detection portion 200*b* in an axially centered position, as for example illustrated in FIG. 5, or in a circumferentially centered position, as for example illustrated in FIG. 6.

Each noise-reducing element 100 is glued on the radially inner surface 501 of the tyre 500 at a respective target area 150 distinct from the service area 250, i.e. not even partially overlapping the service area 250.

Figure 2:
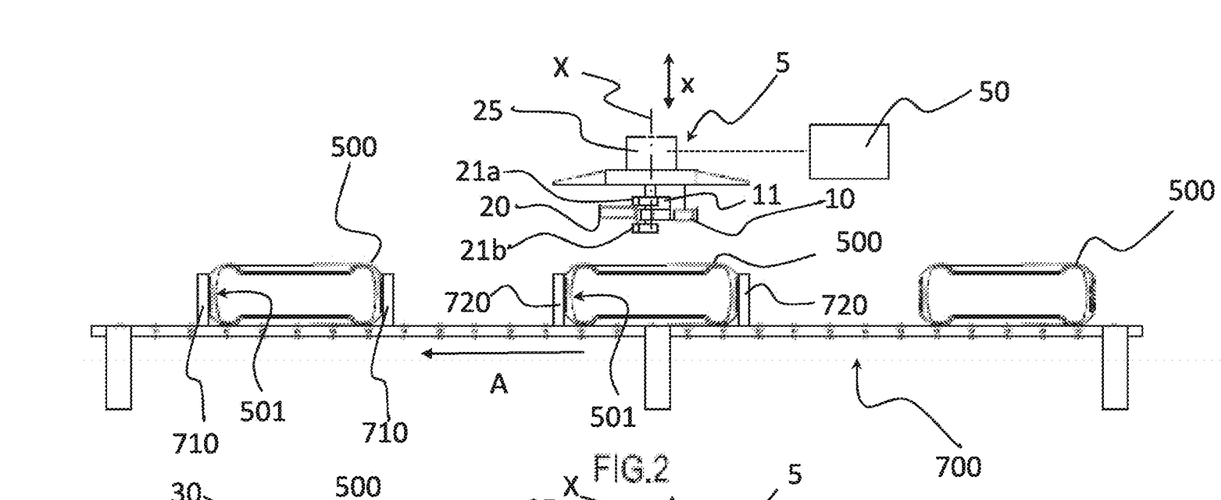
FIG. 2 is a schematic side view of a portion of the apparatus of FIG. 1 in the aforementioned first operative configuration.

With particular reference to FIGS. 2 and 3, the apparatus 1 comprises a detection device 5 configured to inspect the radially inner surface 501 of the tyre 500.

Such an inspection is aimed at detecting the position in circumferential direction of the service area 250 on the aforementioned radially inner surface 501. This takes place after the detection of the position in circumferential direction of the contrast element 210.

The detection device 5 is arranged above the support device 700 and upstream with respect to the position occupied by the aforementioned first tyre. In the specific example illustrated in FIGS. 1-4, the detection device 5 is arranged at the aforementioned second tyre.

Once the position in circumferential direction of the service area 250 on the radially inner surface 501 of the aforementioned second tyre has been detected, such a second tyre is moved along the feeding direction A until it reaches the position that in FIGS. 1-4 is taken by the aforementioned first tyre, so as to be able to proceed with the gluing of the noise-reducing elements 100 on the radially inner surface 501 thereof.

During the detection of the circumferential position of the service area 250, the aforementioned second tyre is held in position on the support device 700 by suitable stop members 720. In the specific example illustrated herein, such stop members 720 are vertically movable with respect to the support device 700 and are uniformly distributed around the tyre 500, so as to also obtain the centering of the tyre 500 with respect to the aforementioned stop members 720. In particular, in the specific example illustrated herein there are six stop members 720 which are equally spaced apart angularly from each other by 60°.

With reference to FIGS. 2 and 3, in the embodiment illustrated herein the detection device 5 comprises a sensor, more preferably a first camera 10, movable along a direction x parallel to (in the specific example illustrated herein, coinciding with) a rotation axis of the aforementioned second tyre. The first camera 10 is also rotatable around a reference axis X parallel to (in the specific example illustrated herein, coinciding with) the rotation axis of the aforementioned second tyre.

Preferably, when operating the first camera 10 carries out at least one complete revolution around the reference axis X.

An encoder 11 is operatively associated with the first camera 10, so as to measure the angular displacement thereof with respect to a predetermined reference position.

The first camera 10 is configured to frame in succession circumferential portions of the radially inner surface 501 of the tyre 500 during its movement around the reference axis X and to acquire a first image of such a radially inner surface 501 when the contrast element 210 and, therefore, the service area 250 is framed.

The apparatus 1 also comprises a control unit 50 operatively associated with the detection device 5 and configured to determine the position in circumferential direction of the service area 250.

The control unit 50 is also configured to determine, based on the position in circumferential direction of the service area 250 and the circumferential dimension of the radially inner surface 501 of the tyre 500, the position in circumferential direction of each target area 150 and to control the gripping member 30 so that each noise-reducing element 100 is glued on the radially inner surface 501 of the tyre 500 at a respective target area 150.

The control unit 50 is also configured to determine the circumferential distance travelled by the first camera 10 with respect to the aforementioned reference position when the first camera 10 has acquired the aforementioned first image.

The control unit 50 is also configured to calculate a first linear dimension based on the aforementioned circumferential distance travelled by the first camera 10 and on the circumferential dimension of the radially inner surface 501 of the tyre 500.

The control unit 50 is also configured to acquire a second image after the aforementioned first image and to determine the orientation of the detection portion 200b with respect to the main portion 200a through comparison of the two images acquired.

Again with reference to FIGS. 2 and 3, the apparatus 1 also comprises a second camera 20 integral in rotation with the first camera 10 and preferably oriented at 180° with respect to the first camera 10.

The second camera 20 is used to inspect the radially inner surface 501 of the tyre 500 for other purposes.

As illustrated in FIG. 2, preferably, a first pair of light sources 21a is arranged above the second camera 20 and a second pair of light sources 21b is arranged below the second camera 20.

Preferably, the light sources 21a, 21b emit UV light and cooperate with the second camera 20 to detect the presence on the radially inner surface 501 of the tyre 500 of possible spots of, or areas coated by, substances specifically applied previously on the radially inner surface 501 of the tyre 500 for the aforementioned other purposes.

The cameras 10 and 20 and the light sources 21a, 21b are mounted on a single upright 25 which is movable along the direction x and rotatable around the reference axis X.

A preferred embodiment of a process for automatically applying the noise-reducing elements 100 to the tyre 500 will now be described. In particular, it is a process which can be carried out by the apparatus 1 described above.

Through such a process it is possible to determine the circumferential position on the radially inner surface 501 of the tyre 500 of a plurality of target areas 150, on which automatically gluing the noise-reducing elements 100, based on the circumferential position on the radially inner surface 501 of the tyre 500 of one or more service areas 250, ensuring the complete non-overlapping between target areas 150 and service areas 250.

As illustrated in FIG. 1, the noise-reducing elements 100 are fed in sequence on the feeding device 650 by the transferring conveyor 600 along the direction A'.

Before or at the same time as the feeding of the noise-reducing elements 100 on the feeding device 650, the tyre 500 on which the noise-reducing elements 100 have to be glued is arranged on the support device 700 and moved along the feeding direction A until it is positioned below the upright 25, with the rotation axis of the tyre 500 substantially aligned with the reference axis X. Such a position corresponds to the position taken by the tyre 500 that previously was indicated as: second tyre.

Once this position has been reached, the stop members 720 are activated in order to hold the tyre 500 in position on the support device 700 (FIG. 2).

Thereafter, the upright 25 is moved downwards along the direction x until the cameras 10 and 20 are arranged inside the cavity defined by the radially inner surface 501 of the tyre 500 (FIG. 3).

Before or after movement of the upright 25 along the direction x, the first camera 10 is brought into the aforementioned reference position.

Preferably, such a reference position is the position in which the first camera 10 is arranged parallel to the feeding direction A and with the visual range thereof oriented downstream with reference to the aforementioned feeding direction A.

Thereafter, the rotation of the upright 25 around the aforementioned reference axis X is activated and the inspection of the radially inner surface 501 of the tyre 500 by the cameras 10 and 20 begins.

When the first camera 10 frames the contrast element 210, it acquires a first image of the framed portion of radially inner surface 501 of the tyre 500.

At the same time as the acquisition of such a first image the encoder 11 supplies as output the angular position of the contrast element 210 with respect to the aforementioned reference position.

Continuing in its rotation around the reference axis X, a second image is acquired immediately after having acquired the first image the first camera 10.

Thereafter, the upright 25 is moved upwards along the direction x until the cameras 10 and 20 are arranged outside of the cavity defined by the radially inner surface 501 of the tyre 500.

The tyre 500 is subsequently moved along the direction A until it reaches the position in which the gluing of the noise-reducing elements 100 is carried out. Such a position corresponds to the position taken by the tyre 500 that previously was indicated as: first tyre.

Meanwhile, the control unit 50, knowing the aforementioned angular position and the circumferential dimension of the radially inner surface 501 of the tyre 500, calculates the circumferential distance that the first camera 10 has travelled with respect to said reference position when said first image was acquired and, based on said circumferential distance, a first linear dimension identifying the position in circumferential direction of the contrast element 210 with respect to the aforementioned reference position is calculated.

The control unit 50 also compares the two images acquired and determines the orientation of the film 200 on the radially inner surface 501 of the tyre 500. In particular, the control unit 50 determines whether the film 200 is associated with the radially inner surface 501 of the tyre 500 so that the detection portion 200*b* is arranged upstream of, downstream of, or parallel to the main portion 200*a* with reference to the feeding direction A.

As described below with reference to some specific examples, depending on the orientation of the film 200 and on the direction of rotation of the first camera 10 around the reference axis X, the control unit 50 adds/subtracts a second linear dimension to/from the aforementioned first linear dimension.

The aforementioned second linear dimension is calculated as the sum between the distance that separates the contrast element 210 from one of the edges of the film 200 in circumferential direction and a predetermined value of spacing apart from said edge. In this way, it is possible to ensure that the first target area is totally not overlapping the service area 250 along the circumferential direction. The control unit 50 consequently controls the gripping member 30 so that the gripping member 30 positions a first noise-reducing element on said first target area.

Preferably, if the first camera 10 rotates around the reference axis X in the anti-clockwise direction, the control unit 50 adds said second linear dimension to the aforementioned first linear dimension. If, on the other hand, the first camera 10 rotates around the reference axis X in the clockwise direction, the control unit 50 subtracts said second linear dimension from the aforementioned first linear dimension.

Preferably, the first noise-reducing element is glued immediately downstream of the film 200.

The subsequent noise-reducing elements 100 are successively glued one at a time on the radially inner surface 501 of the tyre 500 at a predetermined distance from the noise-reducing element 100 which has been glued immediately before. Such a distance is preferably calculated as a function of the difference between the circumferential dimension of the radially inner surface 501 of the tyre 500 and the sum of the lengths in circumferential direction of all of the noise-reducing elements 100.

Preferably, the last noise-reducing element 100 is glued upstream of the film 200, considering an anti-clockwise direction of rotation.

If there are two or more service areas 250 on the radially inner surface 501 of the tyre 500, the control unit 50 carries out the following actions:

determining the position in circumferential direction of the two service areas 250 or, in the case in which more than two service areas 250 are provided, the position in circumferential direction of two circumferentially consecutive service areas 250;

calculating the circumferential distance between said at least two service areas 250;

determining the number of noise-reducing elements 100 which can be applied between said two service areas 250 and, based on the position in circumferential direction of said two service areas 250, the circumferential distance between said two service areas 250, and the length in circumferential direction of the noise-reducing elements 100, the position in circumferential direction of the respective target areas 150 on the radially inner surface 501 of the tyre 500.

EXAMPLES

Example 1

FIG. 5 shows a film 200 glued onto the radially inner surface 501 of the tyre 500 with the detection portion 200*b* arranged downstream with respect to the main portion 200*a* along the feeding direction A.

The first noise-reducing element must be applied immediately downstream of the film 200 considering an anti-clockwise direction of rotation, thus observing FIG. 5 to the left of the film 200.

The film 200 has a length in circumferential direction of 90 mm and an axial length of 90 mm.

The contrast element 210 is 5 mm away from the circumferentially closest edge of the film 200 (the left edge in FIG. 5) and 85 mm away from the circumferentially farthest away edge of the film 200 (the right edge in FIG. 5).

The aforementioned predetermined value of spacing apart from the edge of the film 200 in circumferential direction is equal to 5 mm.

The aforementioned second linear dimension is therefore equal to 10 mm. Such a value is obtained as the sum of 5 mm (distance of the contrast element 210 from the left edge of the film 200) and 5 mm (predetermined value of spacing apart from the left edge of the film 200).

The circumferential dimension of the radially inner surface 501 of the tyre 500 is equal to 2010 mm.

The first camera 10 detects the contrast element 210 at 185° from the reference position, considering an anti-clockwise direction of rotation.

Knowing the length in circumferential direction (90 mm) of the film 200 and the circumferential dimension (2010 mm) of the radially inner surface 501 of the tyre 500, the control unit 50 calculates the circumferential distance travelled by the first camera 10 when the contrast element 210 has been detected through the following formula: 2010×185\360=1032.9 mm. Such a value corresponds to the aforementioned first linear dimension.

The control unit 50 controls the gripping member 30 so that the first noise-reducing element is glued on the radially inner surface 501 of the tyre 500 downstream of the film 200, considering an anti-clockwise direction of rotation, at a target area 150 that is separated from the aforementioned reference position by 1032.9+10=1042.9 mm (sum of the aforementioned first linear dimension and of the aforementioned second linear dimension).

The control unit 50 also calculates the circumferential distance, with respect to the reference position, in which each of the further noise-reducing elements 100 has to be glued on the radially inner surface 501 of the tyre 500, each one at a respective target area 150, by carrying out the following operations and the following calculations.

The length in circumferential direction of the portion of radially inner surface 501 of the tyre 500 on which the further noise-reducing elements 100 has to be glued is obtained as the difference between the circumferential dimension of the radially inner surface 501 of the tyre 500 and the sum of the length in circumferential direction of the service area 250, the predetermined value of spacing apart from the edge of the film 200 in circumferential direction and the length in circumferential direction of the first noise-reducing element. The calculation is, therefore: 2010−(90+5+220)=1695 mm.

The number of noise-reducing elements 100 to be glued on the aforementioned portion of radially inner surface 501 of the tyre 500 is obtained by dividing the length in circumferential direction of the portion of radially inner surface 501 of the tyre 500 on which the further noise-reducing elements 100 has to be glued by the length in circumferential direction of each noise-reducing element 100. The calculation is, therefore: 1695/220=7.7

The integer of the value 7.7 is 7. Therefore, there are seven further noise-reducing elements 100 to be glued on the aforementioned portion of radially inner surface 501 of the tyre 500.

The total length of the portion of radially inner surface 501 of the tyre 500 on which seven noise-reducing elements 100 has to be glued and which does not have noise-reducing elements 100 is obtained by a subtraction between the length in circumferential direction of the portion of radially inner surface 501 of the tyre 500 on which the seven noise-reducing elements 100 has to be glued and the length in circumferential direction of the seven noise-reducing elements 100 to be glued. The calculation is, therefore: 1695−(220×7)=155 mm.

The circumferential distance between the service area 250 and the first noise-reducing element and between the latter and the second noise-reducing element to be glued is obtained by dividing the total length of the portion of radially inner surface 501 of the tyre 500 on which the aforementioned seven noise-reducing elements 100 has to be glued and which does not have noise-reducing elements 100 and the number of free spaces present in the aforementioned portion of radially inner surface 501 of the tyre 500. The calculation is, therefore: 155/7=22.1 mm.

The circumferential distance, with respect to the reference position, in which the second noise-reducing element has to be glued downstream of the second service area, considering an anti-clockwise direction of rotation, is obtained as the sum of the circumferential distance travelled by the first camera 10 when the contrast element 210 present on the film 200 arranged on the service area 250 was detected and the circumferential distance between the aforementioned service area 250 and the aforementioned first noise-reducing element to be glued. The calculation is, therefore: 1032.9+22.1=1055 mm.

The control unit 50 controls the gripping member 30 so that the second noise-reducing element is glued on the radially inner surface 501 of the tyre 500 downstream of the film 200, considering an anti-clockwise direction of rotation, at a target area 150 that is 1055 mm away from the aforementioned reference position.

The other six noise-reducing elements 100 will be glued each downstream of the previous one at a respective target area 150 that is arranged, with respect to the reference position, at a circumferential distance equal to the sum of the circumferential distance of the target area 150 associated with the previous noise-reducing element 100 and 22.1 mm.

Example 2

The only difference with respect to example 1 is that the film 200 is glued on the radially inner surface 501 of the tyre 500 with the detection portion 200b arranged upstream with respect to the main portion 200a along the feeding direction A (i.e. oriented at 180° with respect to the position illustrated in FIG. 5).

In this case, the aforementioned second linear dimension is equal to 90 mm. Such a value is obtained as the sum of 85 mm (distance of the contrast element 210 from the left edge of the film 200) and 5 mm (predetermined value of spacing apart from the left edge of the film 200).

The control unit 50 controls the gripping member 30 so that the first noise-reducing element is glued on the radially inner surface 501 of the tyre 500 downstream of the film 200, considering an anti-clockwise direction of rotation, at a target area 150 that is 1032.9+85+5=1122.9 mm away from the aforementioned reference position, which is the sum of the aforementioned first linear dimension, the distance of the contrast element 210 from the left edge of the film 200 and the aforementioned predetermined value of spacing apart from the edge of the film 200.

The control unit 50 also calculates the circumferential distance, with respect to the reference position, in which each of the further noise-reducing elements 100 has to be glued on the radially inner surface 501 of the tyre 500, each at a respective target area 150, following the same logic described above in example 1.

Example 3

FIG. 6 shows a film 200 glued on the radially inner surface 501 of the tyre 500 with the detection portion 200b arranged parallel to the main portion 200a along the feeding direction A.

The first noise-reducing element must be applied immediately downstream of the film 200 considering an anti-clockwise direction of rotation, thus observing FIG. 6 to the left of the film 200.

The film 200 has a length in circumferential direction of 120 mm and an axial length of 90 mm.

The contrast element 210 is 60 mm away from the opposite edges of the film 200 in circumferential direction.

The aforementioned predetermined value of spacing apart from the edge of the film 200 in circumferential direction is equal to 5 mm.

The aforementioned second linear dimension is therefore equal to 65 mm. Such a value is obtained as the sum of 60 mm (distance of the contrast element 210 from the left edge of the film 200) and 5 mm (predetermined value of spacing apart from the left edge of the film 200).

The circumferential dimension of the radially inner surface 501 of the tyre is equal to 2060 mm.

The first camera 10 detects the contrast element 210 at 285° from the reference position, considering an anti-clockwise direction of rotation.

Knowing the length in circumferential direction (120 mm) of the film 200 and the circumferential dimension (2060 mm) of the radially inner surface 501 of the tyre 500, the control unit 50 calculates the circumferential distance travelled by the first camera 10 when the contrast element 210 was detected through the following formula: 2060×285\360=1630.8 mm. Such a value corresponds to the aforementioned first linear dimension.

The control unit 50 controls the gripping member 30 so that the first noise-reducing element is glued on the radially inner surface 501 of the tyre 500 downstream of the film 200, considering an anti-clockwise direction of rotation, at a target area 150 that is 1630.8+65=1695.8 mm away from the aforementioned reference position, which is the sum of the aforementioned first linear dimension and the aforementioned second linear dimension.

The control unit 50 also calculates the circumferential distance, with respect to the reference position, in which each of the further noise-reducing elements 100 has to be glued on the radially inner surface 501 of the tyre 500, each at a respective target area 150, following the same logic described above in example 1.

Example 4

The only difference with respect to example 3 is that the film 200 is glued on the radially inner surface 501 of the tyre 500 with the detection portion 200b arranged upstream with respect to the main portion 200a along the feeding direction A (i.e. rotated by 90° in the clockwise direction with respect to the position illustrated in FIG. 6).

The contrast element 210 is 5 mm away from the right edge of the film 200 and 85 mm away from the left edge of the film 200.

In this case, the aforementioned second linear dimension is equal to 90 mm. Such a value is obtained as the sum of 85 mm (distance of the contrast element 210 from the left edge of the film 200) and 5 mm (predetermined value of spacing apart from the left edge of the film 200).

The control unit 50 controls the gripping member 30 so that the first noise-reducing element is glued on the radially inner surface 501 of the tyre 500 downstream of the film 200, considering an anti-clockwise direction of rotation, at a target area 150 that is away from the aforementioned reference position by 1032.9+85+5=1122.9 mm, which is the sum of the aforementioned first linear dimension, the distance of the contrast element 210 from the left edge of the film 200 and the aforementioned predetermined value of spacing apart from the edge of the film 200.

The control unit 50 also calculates the circumferential distance, with respect to the reference position, in which each of the further noise-reducing elements 100 has to glued on the radially inner surface 501 of the tyre 500, each at a respective target area 150, following the same logic described above in example 1.

Example 5

The tyre 500 has two service areas 250 circumferentially spaced apart from each other, on each of which a respective film 200 is arranged.

Each film 200 is arranged with the detection portion 200b parallel with respect to the main portion 200a along the feeding direction A, i.e. like the film 200 in FIG. 6.

The first noise-reducing element must be applied immediately downstream of the film 200 arranged on the first service area considering an anti-clockwise direction of rotation.

Each film 200 has a length in circumferential direction of 120 mm and an axial length of 90 mm.

The contrast element 210 is 60 mm away from the opposite edges of the respective film 200 in circumferential direction.

The aforementioned predetermined value of spacing apart from the edge of each film 200 in circumferential direction is equal to 5 mm.

The aforementioned second linear dimension is thus equal to 65 mm. Such a value is obtained as the sum of 60 mm (distance of the contrast element 210 from the left edge of the respective film 200) and 5 mm (predetermined value of spacing apart from the left edge of the respective film 200).

The circumferential dimension of the radially inner surface 501 of the tyre is equal to 2060 mm.

Each noise-reducing element 100 has a length in circumferential direction equal to 220 mm.

The first camera 10 detects the contrast element 210 present on the film 200 arranged on the first service area at 120° from the reference position, considering an anti-clockwise direction of rotation.

The first camera 10 detects the contrast element 210 present on the film 200 arranged on the second service area at 275° from the reference position, considering an anti-clockwise direction of rotation.

Knowing the length in circumferential direction (120 mm) of the films 200 and the circumferential dimension (2060 mm) of the radially inner surface 501 of the tyre 500, the control unit 50 calculates the circumferential distance travelled by the first camera 10 when the contrast element 210 present on the film 200 arranged on the first service area was detected through the following formula: 2060×120\360=686.6 mm. Such a value corresponds to the aforementioned first linear dimension with reference to the film 200 arranged on the first service area.

The control unit 50 also calculates the circumferential distance travelled by the first camera 10 when the contrast element 210 present on the film 200 arranged on the second service area was detected through the following formula: 2060×275\360=1573.6 mm. Such a value corresponds to the aforementioned first linear dimension with reference to the film 200 arranged on the second service area.

The control unit 50 calculates the distance, with respect to the reference position, in which theoretically a first noise-reducing element can be glued immediately downstream of the film 200 arranged on the first service area, considering an anti-clockwise direction of rotation, as the sum of 686.6 mm and 65 mm, which is the sum of the aforementioned first linear dimension associated with the film 200 arranged on the first service area and the aforementioned second linear dimension. Such a distance is equal to 686.6+65=751.6 mm.

The control unit 50 calculates the distance, with respect to the reference position, in which theoretically a further noise-reducing element 100 can be glued downstream of the aforementioned first noise-reducing element and immediately upstream of the film 200 arranged on the second service area, considering an anti-clockwise direction of rotation, as the difference between 1573.6 mm and 65 mm, which is the difference between the aforementioned first linear dimension associated with the film 200 arranged on the second service area and the aforementioned second linear dimension. Such a distance is equal to 1508.6 mm.

The control unit 50 calculates the length of the space available between the two service areas 250 for gluing an integer of noise-reducing elements 100 at respective target areas 150. Such a length is calculated as the difference between 1508.6 mm and 751.6 mm and is equal to 757 mm.

The integer of noise-reducing elements 100 which can be glued in the aforementioned space is calculated as described below.

If it is wished for the noise-reducing elements 100 to be equally spaced in the aforementioned space, the aforementioned integer is obtained by dividing the space available between the two service areas 250 (757 mm) by the length in circumferential direction of each of the noise-reducing elements 100 (220 mm). The following formula applies: 757/220=3.4. The integer of noise-reducing elements 100 relative to the value 3.4 is 3. Therefore, between the two service areas 250 it is possible to glue three equally spaced noise-reducing elements 100.

The control unit 50 calculates the total length of the portion of radially inner surface 501 defined between the two service areas 250 and which does not have noise-reducing elements 100 through the following formula: 757−(220×3)=97 mm (difference between the space available between the two service areas 250 for gluing the three noise-reducing elements 100 and the sum of the length in circumferential direction of the aforementioned three noise-reducing elements 100).

The control unit 50 calculates the circumferential distance between two circumferentially adjacent noise-reducing elements 100 and between each of the two service areas 250 and the circumferentially adjacent noise-reducing element 100, dividing the total length of the portion of radially inner surface 501 defined between the two service areas 250 and which does not have noise-reducing elements 100 (97 mm) by the number of free interspaces present in the aforementioned portion of radially inner surface 501 (2 spaces). Such a circumferential distance is equal to 97/2=48.5 mm.

The control unit 50 thus calculates the circumferential distance, with respect to the reference position, in which a first noise-reducing element has to be actually glued downstream of the film 200 arranged on the first service area, considering an anti-clockwise direction of rotation, as the sum of 686.6 mm (first linear dimension associated with the film 200 arranged on the first service area) and 65 mm (second linear dimension). Such a distance is equal to 868.6+65=751.6 mm.

The control unit 50 thus controls the gripping member 30 so that the first noise-reducing element is glued on the radially inner surface 501 of the tyre 500 downstream of the film 200 arranged on the first service area, considering an anti-clockwise direction of rotation, at a target area 150 that is 751.6 mm away from the aforementioned reference position.

The control unit 50 calculates the circumferential distance, with respect to the reference position, in which a noise-reducing element 100 (hereinafter indicated as second noise-reducing element) can be glued downstream of the aforementioned first noise-reducing element, considering an anti-clockwise direction of rotation, as the sum of 751.6 mm (circumferential distance, with respect to the reference position, of the first noise-reducing element) and 220 mm (length in circumferential direction of the first noise-reducing element) and 48.5 mm (circumferential distance between the first noise-reducing element to be glued and the second noise-reducing element to be glued). Such a distance is equal to 751.6+220+48.5=1020.1 mm.

The control unit 50 thus controls the gripping member 30 so that the second noise-reducing element is glued on the radially inner surface 501 of the tyre 500 downstream of the film 200 arranged on the first service area, considering an anti-clockwise direction of rotation, at a target area 150 that is 1020.1 mm away from the aforementioned reference position.

The control unit 50 calculates the circumferential distance, with respect to the reference position, in which a noise-reducing element 100 (hereinafter indicated as third noise-reducing element) can be glued downstream of the aforementioned second noise-reducing element, considering an anti-clockwise direction of rotation, as the sum of 1020.1 mm (circumferential distance, with respect to the reference position, of the second noise-reducing element) and 220 mm (length in circumferential direction of the second noise-reducing element) and 48.5 mm (circumferential distance between the second noise-reducing element to be glued and the third noise-reducing element to be glued). Such a distance is equal to 1020.1+220+48.5=1288.6 mm.

The control unit 50 thus controls the gripping member 30 so that the third noise-reducing element is glued on the radially inner surface 501 of the tyre 500 downstream of the film 200 arranged on the first service area, considering an anti-clockwise direction of rotation, at a target area 150 that is 1288.6 mm away from the aforementioned reference position.

The control unit 50 also calculates the circumferential distance, with respect to the reference position, in which each of the further noise-reducing elements 100 can be glued on the radially inner surface 501 of the tyre 500, each at a respective target area 150, through the following operations and the following calculations.

The length in circumferential direction of the portion of radially inner surface 501 of the tyre 500 on which the further noise-reducing elements 100 has to be glued is obtained as the difference between the circumferential dimension of the radially inner surface 501 of the tyre 500 and the sum of the circumferential distance between the first two service areas 250, the length in circumferential direction of each of the first two service areas 250 and the predetermined value of spacing apart from the edge of each of the two films 200 in circumferential direction. The calculation is, therefore: 2060−(757+5+5+120+120)=1053 mm.

The number of noise-reducing elements 100 to be glued on the aforementioned portion of radially inner surface 501 of the tyre 500 is obtained by dividing the length in circumferential direction of the portion of radially inner surface 501 of the tyre 500 on which the further noise-reducing elements 100 has to be glued by the length in circumferential direction of each noise-reducing element 100. The calculation therefore: 1053/220=4.7.

The integer that is relative to the value 4.8 is 4. Therefore, there are four further noise-reducing elements 100 to be glued on the aforementioned portion of radially inner surface 501 of the tyre 500.

The total length of the portion of radially inner surface 501 of the tyre 500 on which the four noise-reducing elements 100 have to be glued and which does not have noise-reducing elements 100 is obtained as a subtraction between the length in circumferential direction of the portion of radially inner surface 501 of the tyre 500 on which the four noise-reducing elements 100 have to be glued and the length in circumferential direction of the four noise-reducing elements 100 to be glued. The calculation is, therefore: 1053−(220×4)=173 mm.

The circumferential distance between service area 250 and circumferentially adjacent noise-reducing element 100 and between the latter and another circumferentially adjacent noise-reducing element 100 is obtained by dividing the total length of the portion of radially inner surface 501 of the tyre 500 on which the aforementioned four noise-reducing elements 100 have to be glued and which does not have noise-reducing elements 100 and the number of free spaces present in the aforementioned portion of radially inner surface 501 of the tyre 500. The calculation is, therefore: 173/5=34.6 mm.

The circumferential distance, with respect to the reference position, in which the first of the further four noise-reducing elements 100 has to be glued downstream of the second service area, i.e. the fourth noise-reducing element from the first service area, considering an anti-clockwise direction of rotation, is obtained as the sum of the circumferential distance travelled by the first camera 10 when the contrast element 210 present on the film 200 arranged on the second service area was detected and the circumferential distance between the second service area and the aforementioned fourth noise-reducing element to be glued. The calculation s, therefore: 1573.6+34.6=1608.2 mm.

The circumferential distance, with respect to the reference position, in which the second of the further four noise-reducing elements 100 has to be glued downstream of the second service area, i.e. the fifth noise-reducing element from the first service area, considering an anti-clockwise direction of rotation, is obtained as the sum of the circumferential distance, with respect to the reference position, of the aforementioned fourth noise-reducing element, the length in circumferential direction of the aforementioned fourth noise-reducing element and the circumferential distance between the fourth noise-reducing element to be glued and the aforementioned fifth noise-reducing element to be glued. The calculation is, therefore: 1608.2+220+34.6=1862.8 mm.

The circumferential distance, with respect to the reference position, in which the third of the further four noise-reducing elements 100 has to be glued downstream of the second service area, i.e. the sixth noise-reducing element from the first service area, considering an anti-clockwise direction of rotation, is obtained as the sum of the circumferential distance, with respect to the reference position, of the aforementioned fifth noise-reducing element, the length in circumferential direction of the aforementioned fifth noise-reducing element and the circumferential distance between the fifth noise-reducing element to be glued and the aforementioned sixth noise-reducing element to be glued. The calculation is, therefore: 1862.8+220+34.6=2117.4 mm.

The circumferential distance, with respect to the reference position, in which fourth of the further four noise-reducing elements 100 has to be glued downstream of the second service area, i.e. the seventh noise-reducing element from the first service area, considering an anti-clockwise direction of rotation, is obtained as the sum of the circumferential distance, with respect to the reference position, of the aforementioned sixth noise-reducing element, the length in circumferential direction of the aforementioned sixth noise-reducing element and the circumferential distance between the sixth noise-reducing element to be glued and the aforementioned seventh noise-reducing element to be glued. The calculation is, therefore: 2117.4+220+34.6=2372 mm.

The invention claimed is:

1. A process for applying noise-reducing elements to a tyre for vehicle wheels by an automated gluing apparatus comprising a control unit and a gripping member controlled by said control unit, said tyre having a radially inner surface comprising at least one service area and having a circumferential dimension, said process comprising:
    determining by the control unit a position in circumferential direction of said at least one service area on said radially inner surface of the tyre;
    determining by the control unit a position in circumferential direction of at least one target area on said radially inner surface of the tyre based on the position in circumferential direction of said at least one service area; and
    applying by the gripping member at least one noise-reducing element at said at least one target area,
    wherein determining the position in circumferential direction of said at least one service area comprises:
        circumferentially inspecting said radially inner surface of the tyre starting from a reference position;
        detecting an angular position of said at least one service area with respect to said reference position; and
        determining the position in circumferential direction of said at least one service area based on said angular position and on the circumferential dimension of said radially inner surface of the tyre.

2. The process according to claim 1, wherein inspecting said radially inner surface of the tyre comprises:
    analyzing at least one circumferential portion of said radially inner surface of the tyre by means of a sensor operative to the control unit; and
    moving said sensor around a reference axis parallel to or coinciding with a rotation axis of the tyre starting from said reference position.

3. The process according to claim 2, wherein detecting the angular position of said at least one service area comprises:
    acquiring a first image of said at least one service area when said sensor detects a contrast element provided on said radially inner surface of the tyre at said at least one service area; and
    determining a circumferential distance travelled by said sensor with respect to said reference position when said first image has been acquired.

4. The process according to claim 3, wherein the position in circumferential direction of said at least one service area is determined based on said circumferential distance.

5. The process according to claim 3, wherein said contrast element is defined on a film removably associated with said radially inner surface of the tyre at said at least one service area.

6. The process according to claim 5, wherein said film comprises a main portion and a detection portion adjacent to said main portion and having a first length in circumferential direction and a second length in axial direction, wherein said contrast element is defined on said detection portion.

7. The process according to claim 6, wherein before determining the position in circumferential direction of said at least one service area, said tyre is moved along a feeding direction, and wherein said film is associated with said radially inner surface of the tyre so that said detection portion is arranged upstream of said main portion with reference to said feeding direction, or downstream of said main portion with reference to said feeding direction, or parallel to said main portion with reference to said feeding direction.

8. The process according to claim 7, comprising determining the position of said detection portion with respect to said main portion with reference to said feeding direction by comparing said first image with a second image acquired by said sensor after said first image.

9. The process according to claim 3, wherein determining the position in circumferential direction of said at least one target area comprises calculating a first linear dimension as a function of said circumferential distance.

10. The process according to claim 9, wherein calculating said first linear dimension comprises adding to said circumferential distance, or subtracting from said circumferential distance, a second linear dimension.

11. The process according to claim 2, wherein said sensor is a first camera.

12. The process according to claim 1, wherein the radially inner surface of the tyre comprises at least two service areas, and wherein said process comprises:
    determining the position in circumferential direction of said at least two service areas;
    calculating the circumferential distance between said at least two service areas;
    determining the position in circumferential direction of said at least one target area on said radially inner surface of the tyre based on the position in circumferential direction of said at least two service areas and on the circumferential distance between said at least two service areas; and applying at least one noise-reducing element at said at least one target area.

13. The process according to claim 12, wherein said noise-reducing elements have a set length in circumferential direction and wherein said process comprises determining a number of noise-reducing elements that can be applied between said at least two service areas as a function of said set length in circumferential direction.

* * * * *